United States Patent
Kompala et al.

(10) Patent No.: US 9,584,994 B2
(45) Date of Patent: Feb. 28, 2017

(54) EFFICIENT WAY OF PERFORMING EMERGENCY CALLS IN MULTI-SUBSCRIBER IDENTITY MODULE SOLUTIONS

(71) Applicant: QUALCOMM Incorporated, San Diego, CA (US)

(72) Inventors: Surendra Kompala, Hyderabad (IN); Venkata Raji Reddy Kanthala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/663,255

(22) Filed: Mar. 19, 2015

(65) Prior Publication Data

US 2016/0277910 A1     Sep. 22, 2016

(51) Int. Cl.
| | |
|---|---|
| *H04M 11/04* | (2006.01) |
| *H04W 4/22* | (2009.01) |
| *H04W 76/00* | (2009.01) |
| *H04W 48/18* | (2009.01) |
| *H04W 72/08* | (2009.01) |

(52) U.S. Cl.
CPC ............ *H04W 4/22* (2013.01); *H04W 48/18* (2013.01); *H04W 72/085* (2013.01); *H04W 76/007* (2013.01)

(58) Field of Classification Search
CPC .. H04W 76/007; H04W 48/18; H04W 72/085
USPC .... 455/404.1, 404.2, 405, 407, 550.1, 552.1
See application file for complete search history.

(56) References Cited

U.S. PATENT DOCUMENTS

| | | | |
|---|---|---|---|
| 7,190,947 B2 | 3/2007 | Binzel et al. | |
| 8,559,909 B2 * | 10/2013 | Mallick | H04L 12/5691 455/404.1 |
| 2010/0113010 A1 * | 5/2010 | Tenny | H04L 12/66 455/423 |
| 2010/0297979 A1 | 11/2010 | Watfa et al. | |
| 2011/0207427 A1 * | 8/2011 | Kitani | H04W 60/005 455/404.1 |

(Continued)

FOREIGN PATENT DOCUMENTS

| | | |
|---|---|---|
| WO | 2010024111 A1 | 3/2010 |
| WO | 2011088066 A1 | 7/2011 |

(Continued)

OTHER PUBLICATIONS

International Search Report and Written Opinion—PCT/US2016/022470—ISA/EPO—Oct. 31, 2016.

(Continued)

*Primary Examiner* — Khai M Nguyen
(74) *Attorney, Agent, or Firm* — Procopio, Cory, Hargreaves & Savitch LLP

(57) ABSTRACT

A method for performing emergency calls includes: camping a first subscription of a mobile communication device on a first cell on a first communication network; camping a second subscription of the mobile communication device on a second cell on a second communication network; determining by the mobile communication device whether one of the first and second subscriptions supports emergency calls; and initiating an emergency call on the determined subscription.

30 Claims, 4 Drawing Sheets

(56) References Cited

U.S. PATENT DOCUMENTS

2012/0028661 A1* 2/2012 Fang ................ H04W 36/0022
455/466
2012/0142308 A1* 6/2012 Lee ....................... H04W 4/003
455/404.1

FOREIGN PATENT DOCUMENTS

WO          2014090338 A1    6/2014
WO    WO 2014090340 A1 *   6/2014   ............. H04W 4/22

OTHER PUBLICATIONS

Partial International Search Report—PCT/US2016/022470—ISA/EPO—Sep. 9, 2016.

* cited by examiner

EFFICIENT WAY OF PERFORMING EMERGENCY CALLS IN MULTI-SUBSCRIBER IDENTITY MODULE SOLUTIONS

BACKGROUND

Some Global System for Mobile communications (GSM) networks may not allow emergency calls because the access class for allowing emergency calls is not set by the network. The Third Generation Partnership Project (3GPP) access class 10 indicates whether emergency calls are allowed or not on a particular cell. Access class 10 and other access class restrictions are broadcast in the random access channel (RACH) control parameters information element (IE) of the one or more system information messages on the Broadcast Control Channel (BCCH). In some cases the received signal strength indication (RSSI) and signal-to-noise ratio (SNR) of the particular cell may be high and normal calls are allowed on the cell, but emergency calls may not be allowed due to access class restrictions.

Subscriber Identity Modules (SIMs) in a mobile communication device are provisioned with an access class level between 0 and 15. Most SIMs are coded with a random access class level between 0 and 9. For special case mobile customers, for example, emergency services, government officials, civil defense, etc., a SIM with a high access class value may be issued (between 10 and 15). Cell sites may be configured to transmit an access class value in the broadcast channel (i.e., the RACH control parameters IE of the system information message) of the cell. In most cases, access class levels 0-15 are allowed. However, some GSM networks may not allow emergency calls because the access class for allowing emergency calls is not set by the network.

The SIM compares the broadcast access class level with the SIM's own access class level. If the allowed access class level broadcast by the cell site does not match the access class level of the SIM, then the mobile communication device cannot access that cell for any services. If access class 10 is indicated as barred in a cell, a mobile communication device having a SIM with access class 0 to 9 or without an International Mobile Subscriber Identity (IMSI) is not allowed to initiate emergency calls in this cell. However, emergency calls may not be restricted on one or more subscriptions of a multi-SIM mobile communication device.

SUMMARY

Apparatuses and methods for performing emergency calls are provided.

According to various embodiments there is provided a method for performing emergency calls. In some embodiments, the method may include: camping a first subscription of a mobile communication device on a first cell on a first communication network; camping a second subscription of the mobile communication device on a second cell on a second communication network; determining by the mobile communication device whether one of the first and second subscriptions supports emergency calls; and initiating an emergency call on the determined subscription.

According to various embodiments there is provided a mobile communication device. In some embodiments, the mobile communication device may include: a communication unit configured to communicate with at least a first communication network and a second communication network; and a control unit configured to control operation of the mobile communication device.

The control unit may be configured to cause the communication unit to camp a first subscription of the mobile communication device on a first cell on the first communication network; cause the communication unit to camp a second subscription of the mobile communication device on a second cell on the second communication network; determine whether one of the first and second subscriptions supports emergency calls; and i cause the communication unit to initiate an emergency call on the determined subscription.

According to various embodiments there is provided a method for performing an emergency call. In some embodiments, the method may include: camping a first subscription of a mobile communication device on a first cell on a first communication network; camping a second subscription of the mobile communication device on a second cell on a second communication network; initiating an emergency call on the first cell; determining by the mobile communication device if the emergency call fails; in response to a determination that the emergency call failed, evaluating cell quality of the first cell and the second cell; and initiating the emergency call on the second cell or re-initiating the emergency call on the first cell based on the evaluated cell quality of the first cell and the second cell.

According to various embodiments there is provided a mobile communication device for performing an emergency call. In some embodiments, the mobile communication device may include: a communication unit configured to communicate with a first communication network and a second communication network; and a control unit.

The control unit may be configured to cause the communication unit to camp a first subscription of a on a first cell on the first communication network and camp a second subscription of a on a second cell on the second communication network, initiate an emergency call on the first cell, determine if the emergency call fails, and in response to a determination that the emergency call failed: evaluate cell quality of the first cell and the second cell, and initiate the emergency call on the second cell or re-initiate the emergency call on the first cell based on the evaluated cell quality of the first cell and the second cell Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
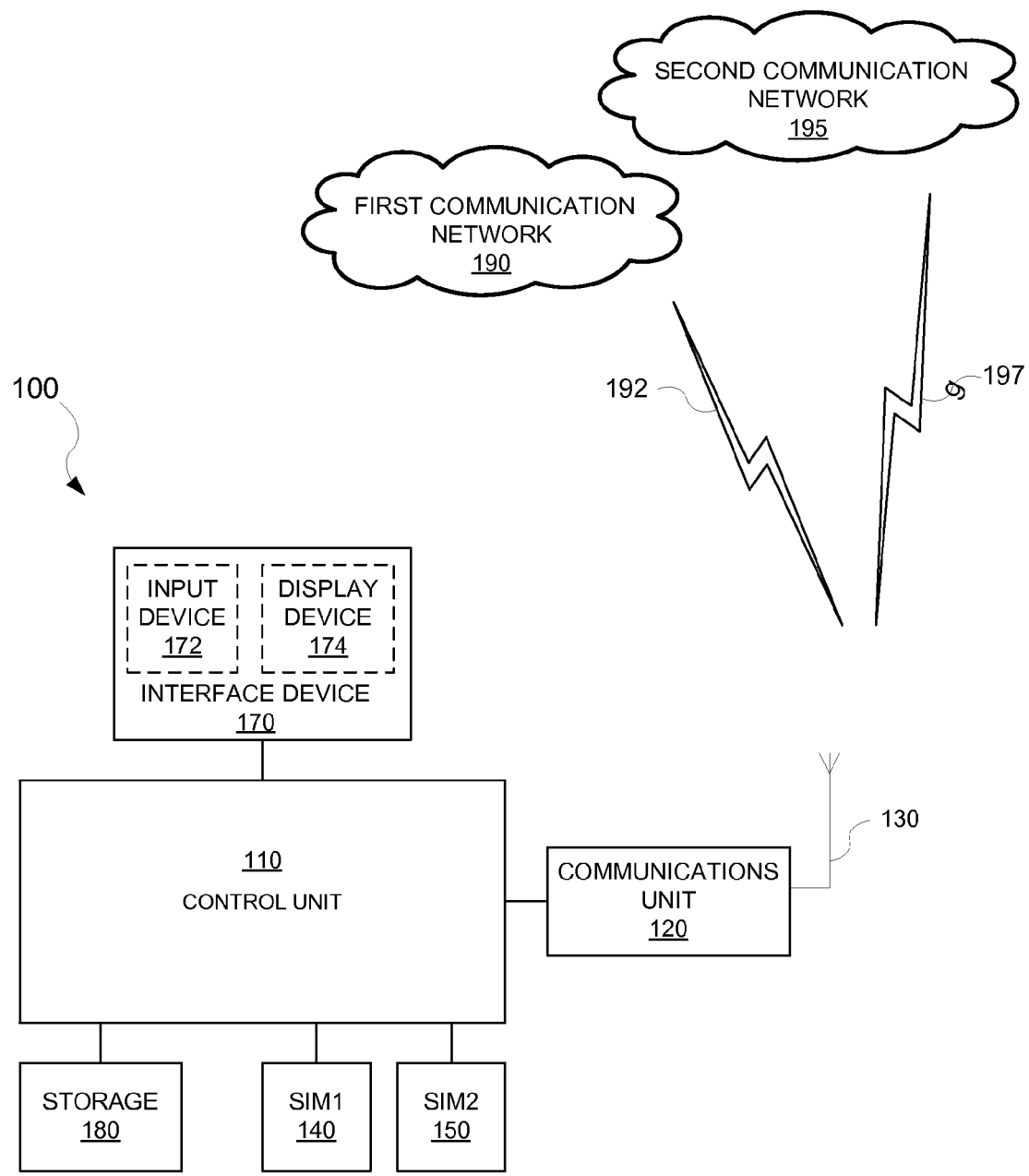
FIG. 1 is a block diagram illustrating a mobile communication device according to various embodiments.

FIG. 1 is a block diagram illustrating a mobile communication device 100 according to various embodiments. As illustrated in FIG. 1, the mobile communication device 100 may include a control unit 110, a communication unit 120, an antenna 130, a first SIM 140, a second SIM 150, a user interface device 170, and a storage 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communication units) and may interface with one or more antennas without departing from the scope of the present inventive concept.

The communication unit 120 may include, for example, but not limited to, a radio frequency (RF) module 122. The RF module 122 may include, for example, but not limited to a first transceiver (not shown). The first SIM 140 may associate the communication unit 120 with a first subscription (Sub1) 192 on a first communication network 190 and the second SIM 150 may associate the communication unit 120 with a second subscription (Sub2) 197 on a second communication network 195. One of ordinary skill in the art will appreciate that either subscription may be associated with either communication network without departing from the scope of the present inventive concept.

The first communication network 190 and the second communication network 195 may be operated by the same or different service providers, and/or may support the same or different radio access technologies (RATs), for example, but not limited to, GSM, wideband code division multiple access (WCDMA), Time Division Synchronous CDMA (TDSCDMA), CDMA (1×), CDMA 2000, and long term evolution (LTE).

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the communication unit 120, the user interface device 170, and the storage 180. The control unit 110 may be a programmable device, for example, but not limited to, a microprocessor (e.g., general-purpose processor, baseband modem processor, etc.) or microcontroller.

The storage 180 may be configured to store application programs necessary for operation of the mobile communication device 100 that are executed by the control unit 110, as well as application data and user data.

For a multi-SIM multi-standby (MSMS) or multi-SIM multi-active (MSMA) mobile communication device (e.g., the mobile communication device 100), emergency calls may be restricted or unsupported on one subscription (e.g., Sub1 192) but may be supported on another subscription (e.g. Sub2 197). The subscriptions may be camped on different cells and may be associated with the same or different communication network operators. The subscriptions may be associated with different RATs for the same communication network operator.

For convenience, various embodiments are explained in terms of a dual-SIM dual-standby (DSDS) device. Sub1 192 may be associated with the first communication network 190 on a first RAT and Sub2 may be associated with the second communication network 195 on a second RAT. One of ordinary skill in the art will appreciate that the present inventive concept is extended to dual-SIM dual-active (DSDA), MSMS, and MSMA devices without departing from the scope of the present inventive concept.

Figure 2:
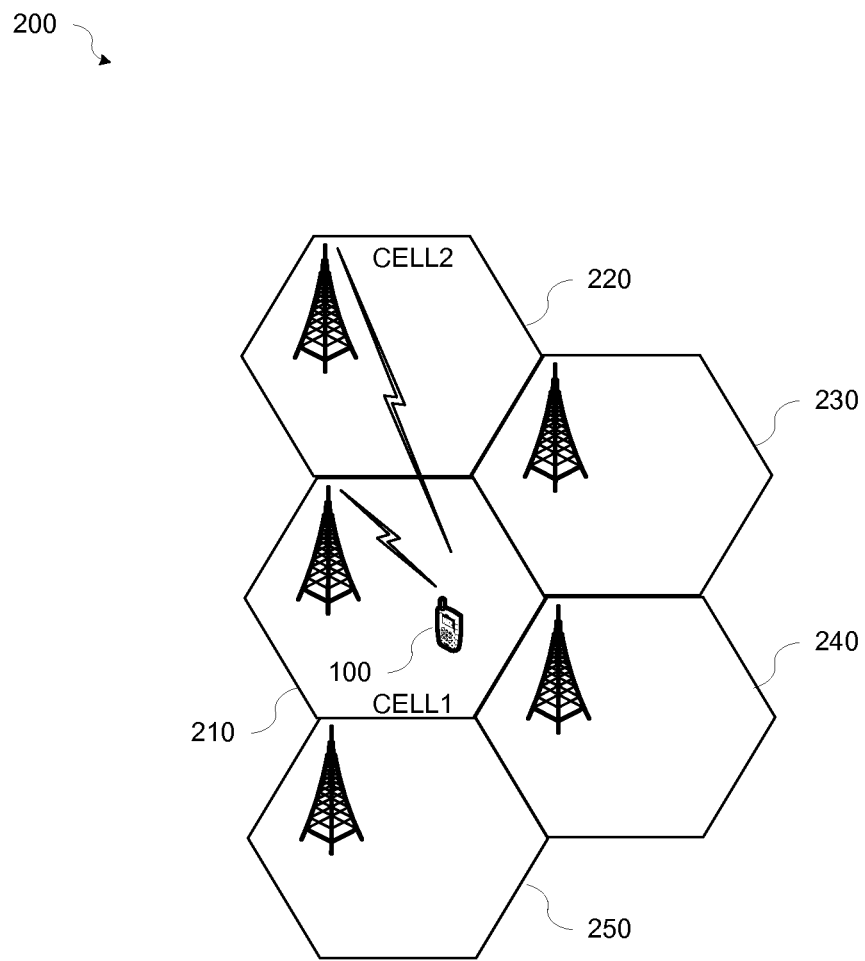
FIG. 2 is a diagram illustrating an example network environment.

FIG. 2 is a diagram illustrating an example network environment 200. Referring to FIGS. 1 and 2, the network environment 200 may include a plurality of cells 210-250. One of ordinary skill in the art will appreciate that some or all of the cells may be associated with the same or different service providers and may support the same or different RATs. The mobile communication device 100 may be camped on a first cell (Cell1) 210 on one of Sub1 192 and Sub2 197, and may be camped on a second cell (Cell2) 220 on the other of Sub1 192 and Sub2 197.

Figure 3:
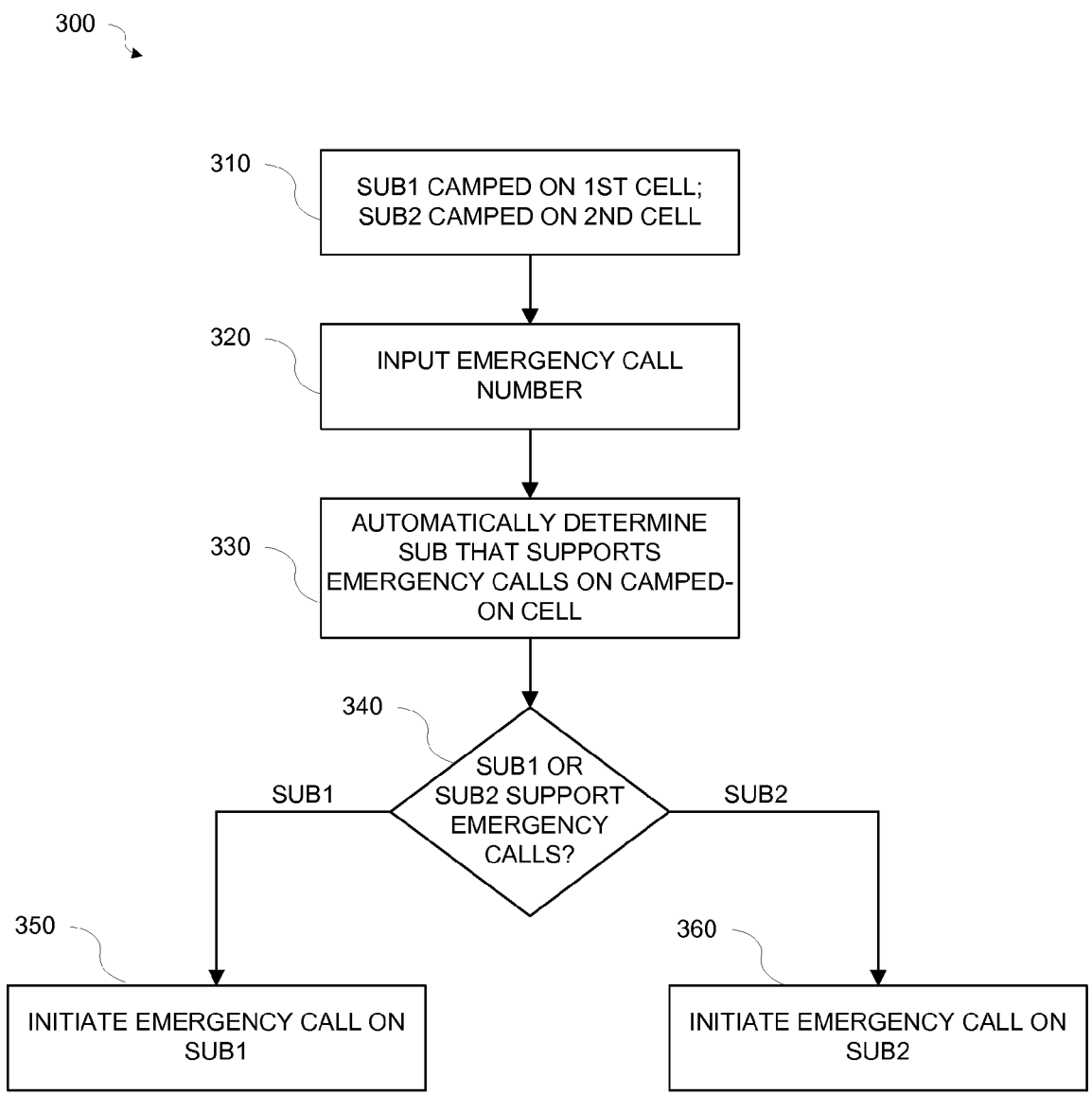
FIG. 3 is a flowchart illustrating a method for performing emergency calls according to various embodiments.

FIG. 3 is a flowchart of a method 300 for performing emergency calls according to various embodiments. Referring to FIGS. 1-3, Sub1 192 may be camped on the first cell (e.g., Cell1 210) on the first communication network 190, and Sub2 197 may be camped on the second cell (e.g., Cell2 220) on the second communication network 195 (310).

A telephone number for an emergency call may be input to the mobile communication device 100 (320). For example, a telephone number for an emergency call may be input by entering numbers on the input device 172 on the user interface device 170. Alternatively, a telephone number for an emergency call may be input via a specified key on the input device 172, for example, a key preprogrammed to input a telephone number for an emergency call. One of ordinary skill in the art will appreciate that any method of inputting a telephone number for an emergency call may be used without departing from the scope of the present inventive concept.

In response to the input of the telephone number for the emergency call, the control unit 110 may determine which (if any) of the subscriptions (e.g., Sub1 192 or Sub2 197) supports emergency calls on their respective camped-on cells (330). For example, the control unit 110 may determine an access class level of the first SIM 140 and the second SIM 150. The control unit 110 may compare an access class level of the first SIM 140 to an access class value in RACH control parameters IE of a system information message for the first cell 210 camped-on by Sub1 192. Similarly, the control unit 110 may compare an access class level of the second SIM 150 to an access class value in the RACH control parameters IE of the system information message for the second cell 220 camped-on by Sub2 197. In some embodiments, the determination may be performed automatically.

In response to a determination that Sub1 192 supports emergency calls, (340-SUB1), the control unit 110 may initiate the emergency call on Sub1 192 (350). In some embodiments, the emergency call on Sub1 192 may be initiated automatically. On the other hand, in response to a determination that Sub2 197 supports emergency calls, (340-SUB2), the control unit may initiate the emergency call on Sub2 197 (360). In some embodiments, the emergency call on Sub2 197 may be initiated automatically.

One of ordinary skill in the art will appreciate that the operations described with respect to the method 300 may be implemented as a non-transitory computer readable medium having stored therein instructions for executing the described operations.

Figure 4:
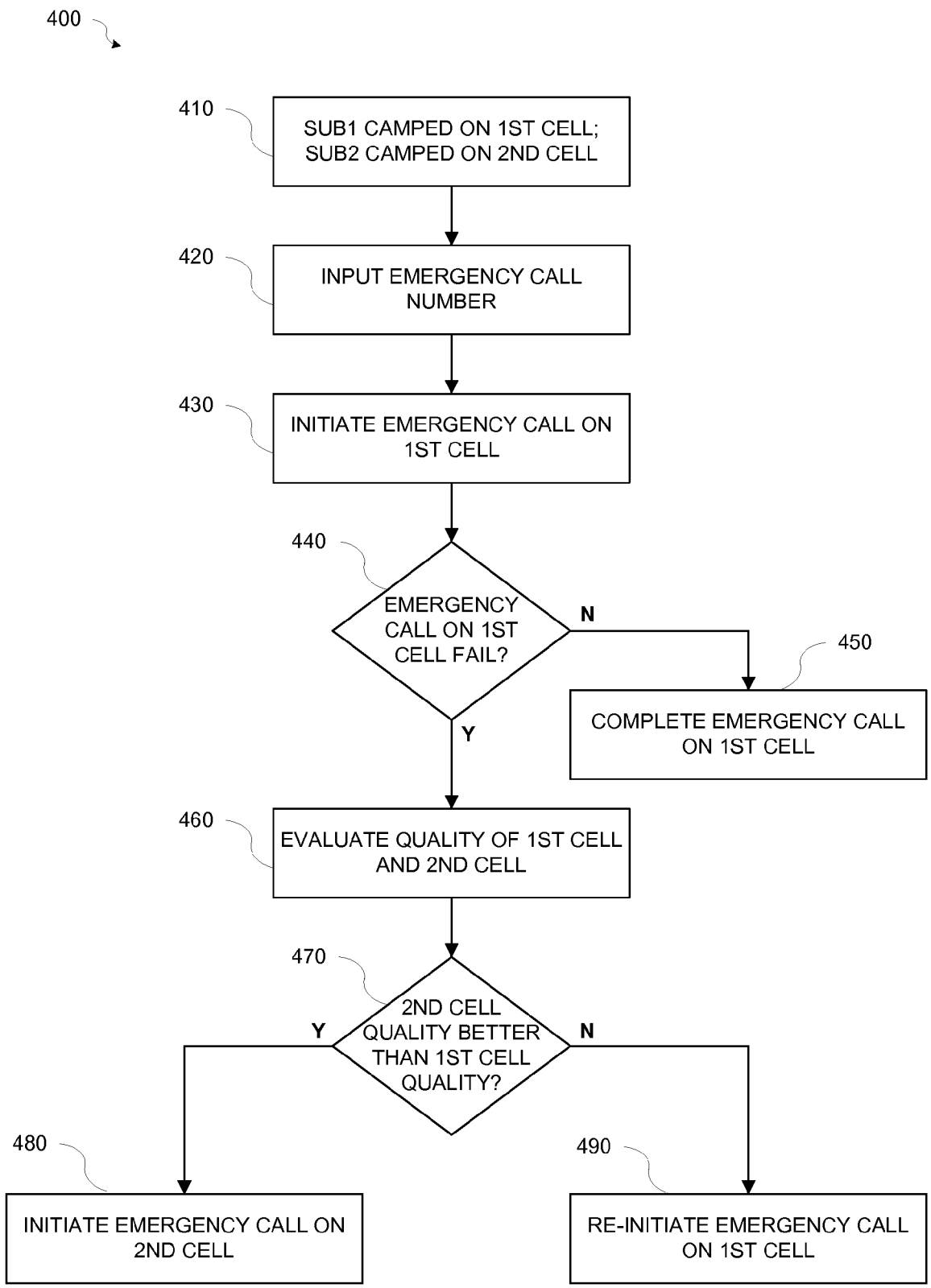
FIG. 4 is a flowchart illustrating another method for performing emergency calls according to various embodiments.

FIG. 4 is a flowchart illustrating another method 400 for performing emergency calls according to various embodiments. Referring to FIGS. 1-4, Sub1 192 may be camped on the first cell (e.g., Cell1 210) on the first communication network 190 and Sub2 197 may be camped on the second cell (e.g., Cell2 220) on the second communication network 195 (410). A telephone number for an emergency call may be input to the mobile communication device 100 (420), and the emergency call may be initiated on the first cell 210 (430).

The control unit 110 may determine if the emergency call on the first cell 210 fails (440). In response to a determination that the emergency call on the first cell 210 is successful (440-N), the control unit 110 may cause the mobile communication device 100 to complete the emergency call on the first cell 210 (450).

In response to a determination that the emergency call on the first cell 210 fails (440-Y), the control unit 110 may evaluate the quality of the first cell 210 and the second cell 220 (460). The control unit 110 may compare one or more factors, for example, but not limited to, received signal strength indication (RSSI), signal-to-noise ratio (SNR), received signal code power (RSCP), etc., to determine the quality of the cells. The control unit 110 may determine if the quality of the second cell 220 is better that the quality of the first cell 210 (470).

In response to a determination that the quality of the second cell 220 is better than the quality of the first cell 210 (470-Y), the control unit 110 may initiate the emergency call on the second cell 220 (480). In response to a determination that the quality of the second cell 220 is not better than the quality of the first cell 210 (470-N), the control unit 110 may re-initiate the emergency call on the first cell 210 (490).

One of ordinary skill in the art will appreciate that the operations described with respect to the method 400 may be implemented as a non-transitory computer readable medium having stored therein instructions for executing the described operations.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for performing a mobile originated (MO) emergency call, the method comprising:
   camping a first subscription of a mobile communication device on a first cell on a first communication network;
   camping a second subscription of the mobile communication device on a second cell on a second communication network;
   determining by the mobile communication device which one of the first and second subscriptions supports mobile originated (MO) emergency calls; and
   initiating an MO emergency call on the determined subscription.

2. The method of claim 1, wherein the determined subscription is the first subscription.

3. The method of claim 1, wherein the determined subscription is the second subscription.

4. The method of claim 1, wherein the first communication network and the second communication network are operated by different communication network operators.

5. The method of claim 1, wherein the first communication network and the second communication network are operated by a same communication network operator.

6. The method of claim 1, wherein
   the first subscription is associated with the first communication network on a first radio access technology (RAT), and
   the second subscription is associated with the second communication network on a second RAT.

7. The method of claim 6, wherein the first RAT is different from the second RAT.

8. The method of claim 1, wherein
   the first subscription is associated with a first network operator, and
   the second subscription is associated with a second network operator.

9. The method of claim 8, wherein the first network operator is different from the second network operator.

10. The method of claim 1, wherein the first cell is different from the second cell.

11. A mobile communication device, comprising:
    a communication unit configured to communicate with at least a first communication network and a second communication network; and
    a control unit configured to control operation of the mobile communication device, wherein the control unit is configured to:
    cause the communication unit to camp a first subscription of the mobile communication device on a first cell on the first communication network;
    cause the communication unit to camp a second subscription of the mobile communication device on a second cell on the second communication network;
    determine whether one of the first and second subscriptions supports mobile originated (MO) emergency calls; and
    cause the communication unit to initiate an MO emergency call on the determined subscription.

12. The mobile communication device of claim 11, wherein the determined subscription is the first subscription.

13. The mobile communication device of claim 11, wherein the determined subscription is the second subscription.

14. The mobile communication device of claim 11, wherein the first communication network and the second communication network are operated by different communication network operators.

15. The mobile communication device of claim 11, wherein the first communication network and the second communication network are operated by a same communication network operator.

16. The mobile communication device of claim 11, wherein
    the first subscription is associated with the first communication network on a first radio access technology (RAT), and
    the second subscription is associated with the second communication network on a second RAT.

17. The mobile communication device of claim 16, wherein the first RAT is different from the second RAT.

18. The mobile communication device of claim 11, wherein
    the first subscription is associated with a first network operator, and
    the second subscription is associated with a second network operator.

19. The mobile communication device of claim 18, wherein the first network operator is different from the second network operator.

20. The mobile communication device of claim 11, wherein the first cell is different from the second cell.

21. A method for performing a mobile originated (MO), the method comprising:
    camping a first subscription of a mobile communication device on a first cell on a first communication network;
    camping a second subscription of the mobile communication device on a second cell on a second communication network;
    initiating the MO emergency call on the first cell;
    determining by the mobile communication device if the MO emergency call fails;
    in response to a determination that the MO emergency call failed, evaluating cell quality of the first cell and the second cell; and
    initiating the MO emergency call on the second cell or re-initiating the MO emergency call on the first cell based on the evaluated cell quality of the first cell and the second cell.

22. The method of claim 21, further comprising:
    in response to a determination that the cell quality of the second cell is better than the cell quality of the second cell, initiating the MO emergency call on the second cell.

23. The method of claim 21, further comprising:
    in response to a determination that the cell quality of the second cell is not better than the cell quality of the second cell, re-initiating the MO emergency call on the first cell.

24. The method of claim 21, wherein the first cell and the second cell are associated with networks operated by different communication network operators.

25. The method of claim 21, wherein
the first cell is associated with the first communication network on a first radio access technology (RAT), and
the second cell is associated with the second communication network on a second RAT.

26. The method of claim 21, wherein
the first subscription is associated with a first network operator, and
the second subscription is associated with a second network operator.

27. The method of claim 21, wherein the first cell is different from the second cell.

28. A mobile communication device, comprising:
a communication unit configured to communicate with a first communication network and a second communication network; and
a control unit configured to:
cause the communication unit to camp a first subscription on a first cell on the first communication network and camp a second subscription on a second cell on the second communication network,
initiate a mobile originated (MO) emergency call on the first cell,
determine if the MO emergency call fails, and
in response to a determination that the MO emergency call failed:
evaluate cell quality of the first cell and the second cell, and
initiate the MO emergency call on the second cell or re-initiate the MO emergency call on the first cell based on the evaluated cell quality of the first cell and the second cell.

29. The mobile communication device of claim 28, wherein
in response to a determination that the cell quality of the second cell is better than the cell quality of the second cell, the control unit is configured to initiate the MO emergency call on the second cell.

30. The mobile communication device of claim 28, wherein
in response to a determination that the cell quality of the second cell is not better than the cell quality of the second cell, the control unit is configured to re-initiate the MO emergency call on the first cell.

\* \* \* \* \*